(12) United States Patent
Tate et al.

(10) Patent No.: US 10,641,334 B1
(45) Date of Patent: May 5, 2020

(54) TAPERED ROLLER BEARING WITH CAGE FOR LUBRICANT CONTROL

(71) Applicant: Schaeffler Technologies AG & Co. KG, Herzogenaurach (DE)

(72) Inventors: Shaun Tate, Grand Blanc, MI (US); Alaa Makke, Farmington Hills, MI (US)

(73) Assignee: Schaeffler Technologies AG & Co. KG, Herzogenaurach (DE)

(*) Notice: Subject to any disclaimer, the term of this patent is extended or adjusted under 35 U.S.C. 154(b) by 0 days.

(21) Appl. No.: 16/166,234

(22) Filed: Oct. 22, 2018

(51) Int. Cl.
| *F16C 33/66* | (2006.01) |
| *F16C 33/46* | (2006.01) |
| *F16C 19/36* | (2006.01) |

(52) U.S. Cl.
CPC ........ *F16C 33/6659* (2013.01); *F16C 19/364* (2013.01); *F16C 33/46* (2013.01)

(58) Field of Classification Search
CPC .... F16C 19/364; F16C 19/4605; F16C 19/54; F16C 19/542; F16C 19/585; F16C 19/6674
See application file for complete search history.

(56) References Cited

U.S. PATENT DOCUMENTS

| 3,628,835 A * | 12/1971 | Cornish | ............... F16C 19/364 384/465 |
| 2005/0213861 A1* | 9/2005 | Ono | ............... F16C 19/364 384/571 |
| 2007/0230851 A1 | 10/2007 | Matsuyama et al. | |
| 2015/0252848 A1* | 9/2015 | Suzuki | ............... F16C 19/49 384/571 |
| 2015/0323008 A1 | 11/2015 | Koganei et al. | |
| 2017/0204909 A1 | 7/2017 | Murata et al. | |
| 2017/0307015 A1 | 10/2017 | Kamamoto et al. | |
| 2017/0321750 A1* | 11/2017 | Kamamoto | ........... F16C 33/664 |

FOREIGN PATENT DOCUMENTS

| CN | 104565021 A | 4/2015 |
| JP | 2010007788 A | 1/2010 |
| WO | 15045746 A1 | 4/2015 |

OTHER PUBLICATIONS

Koyo, Low Friction Torque Bearing LFT-Series, Catalog, CAT. NOB1023E, p. 3.

* cited by examiner

*Primary Examiner* — Phillip A Johnson
(74) *Attorney, Agent, or Firm* — Reid A. Baldwin

(57) ABSTRACT

Tapered roller bearings are disclosed. The bearing may include an inner ring defining an inner raceway and an outer ring defining an outer raceway. A plurality of tapered rollers may be disposed between the inner and outer rings and a cage may be configured to retain the plurality of tapered rollers. The inner ring may include a rib at a first axial end configured to retain a larger diameter end of the tapered rollers but not have a rib at a second axial end that is proximate a smaller diameter end of the tapered rollers. A gap may be defined between the cage and the inner ring at the second axial end, the gap configured to control a lubricant flow to the plurality of tapered rollers.

20 Claims, 5 Drawing Sheets

TAPERED ROLLER BEARING WITH CAGE FOR LUBRICANT CONTROL

TECHNICAL FIELD

The present disclosure relates generally to a tapered roller bearing, for example, having a labyrinth cage for lubricant control.

BACKGROUND

Bearing assemblies generally include a plurality of rolling elements sandwiched between opposing raceways in bearing rings. The rolling elements may take many forms, such as spherical balls, rollers, tapered rollers, barrel-shaped spherical rollers, or others. Bearing assemblies are used in a wide range of applications. Tapered roller bearings generally comprise solid inner and outer rings with tapered raceways and tapered rollers with cages. Tapered roller bearings typically have high radial and axial load carrying capacity and a large usable speed range,

SUMMARY

In at least one embodiment, a tapered roller bearing is provided. The bearing may include an inner ring defining an inner raceway and an outer ring defining an outer raceway; a plurality of tapered rollers disposed between the inner and outer rings; and a cage configured to retain the plurality of tapered rollers. The inner ring may include a rib at a first axial end configured to retain a larger diameter end of the tapered rollers but not have a rib at a second axial end that is proximate a smaller diameter end of the tapered rollers. A gap may be defined between the cage and the inner ring at the second axial end, the gap configured to control a lubricant flow to the plurality of tapered rollers. In one embodiment, the cage is retained on the rib at the first axial end of the inner ring. The rib may include a projection and the cage may be retained on the projection.

In an embodiment, the cage includes a radially extending portion that radially overlaps with an end face of the second axial end of the inner ring to form the gap. The gap may have a constant width defined between the cage and the end face. In one example, the gap has a width of 0.1 to 1.5 mm. An axially outer end face of the cage adjacent to the second axial end of the inner ring may have a concave shape and may be configured to fling away lubricant.

In another embodiment, the cage may include a portion that extends radially and axially inward such that it radially overlaps with an end face of the second axial end of the inner ring to form the gap. The cage may be a stamped metal piece. In another embodiment, the cage may include a portion that extends parallel to the inner raceway and axially outward past an end face of the second axial end of the inner ring, the gap being formed between the portion and the inner raceway. The gap may have a constant width defined between the portion and the inner raceway. In one example, the gap has a width of 0.1 to 1.5 mm.

In another embodiment, the cage may include a first radially extending portion that radially overlaps with an end face of the second axial end of the inner ring to form a first section of the gap; and the cage may include a second portion that extends parallel to the inner raceway and axially outward past the end face of the second axial end of the inner ring, a second section of the gap being formed between the second portion and the inner raceway. The first and second sections of the gap may be contiguous. The first and second sections of the gap may have a same width.

In at least one embodiment, a tapered roller bearing is provided. The bearing may include an inner ring defining an inner raceway and an outer ring defining an outer raceway; a plurality of tapered rollers disposed between the inner and outer rings; and a cage configured to retain the plurality of tapered rollers. The inner ring may include a rib at a first axial end configured to retain a larger diameter end of the tapered rollers and may remain radially inward of the tapered rollers at a second axial end that is proximate a smaller diameter end of the tapered rollers. A gap may be defined between the cage and the inner ring at the second axial end, the gap having a width of 0.1 to 1.5 mm.

DETAILED DESCRIPTION

Figure 1:
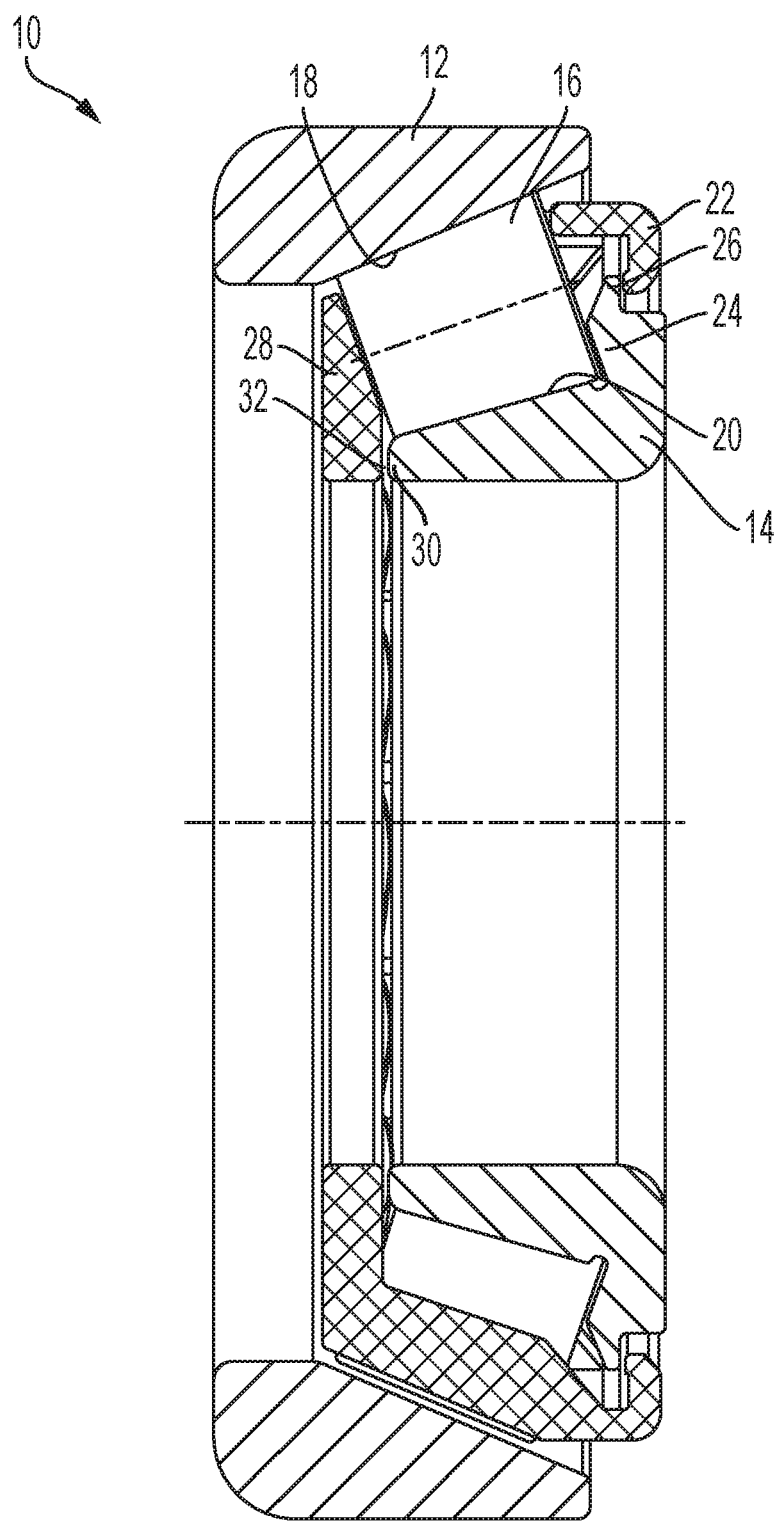
FIG. 1 is a cross-section of a tapered roller bearing, according to an embodiment.

At the outset, it should be appreciated that like drawing numbers appearing in different drawing views identify identical, or functionally similar, structural elements. Furthermore, it is understood that this disclosure is not limited only to the particular embodiments, methodology, materials and modifications described herein, and as such may, of course, vary. As those of ordinary skill in the art will understand, various features illustrated and described with reference to any one of the figures can be combined with features illustrated in one or more other figures to produce embodiments that are not explicitly illustrated or described.

The terminology used herein is for the purpose of describing particular aspects only, and is not intended to limit the scope of the present disclosure, which is limited only by the appended claims. It is to be understood that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments.

Unless defined otherwise, all technical and scientific terms used herein have the same meaning as commonly understood to one of ordinary skill in the art to which this disclosure belongs. Although any methods, devices or materials similar or equivalent to those described herein can be used in the practice or testing of the disclosure, the following example methods, devices, and materials are now described.

With reference to FIGS. 1-5, example embodiments are shown of a tapered roller bearing 10 in cross-section. The tapered roller bearing 10 includes an outer bearing ring 12 and an inner bearing ring 14. Between the rings are arranged tapered rollers 16, which roll on raceways 18 and 20 of the bearing rings 12 and 14, respectively. The rollers 16 are accommodated in a cage 22. The tapered rollers 16 may have a larger diameter end (right side, as shown) and a smaller diameter end (left side, as shown).

In at least one embodiment, the inner ring 14 may include a rib 24 on one axial end that extends over the end face of the rollers 16 on the larger diameter end. The rib 24 may help located the rollers 16 and prevent them from moving in one direction along the roller axis (dotted line). The rib 24 may further include a projection 26, which may engage with the cage 22 to at least partially secure the cage 22 within the bearing. In one embodiment, the projection 26 may extend in the radial direction (as shown), and may engage a radially extending portion of the cage 22.

Figure 2:
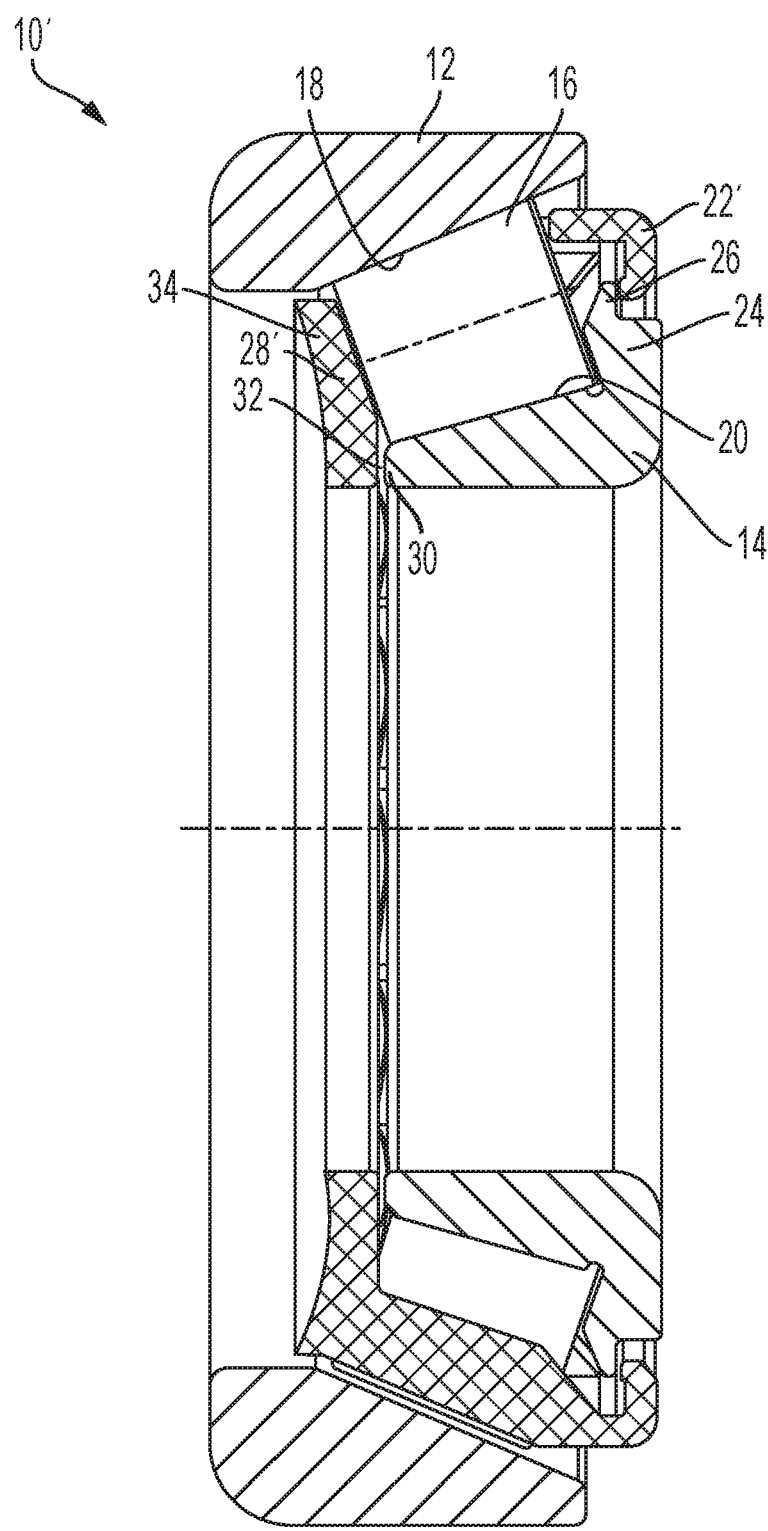
FIG. 2 is a cross-section of a tapered roller bearing, according to another embodiment.
Figure 3:
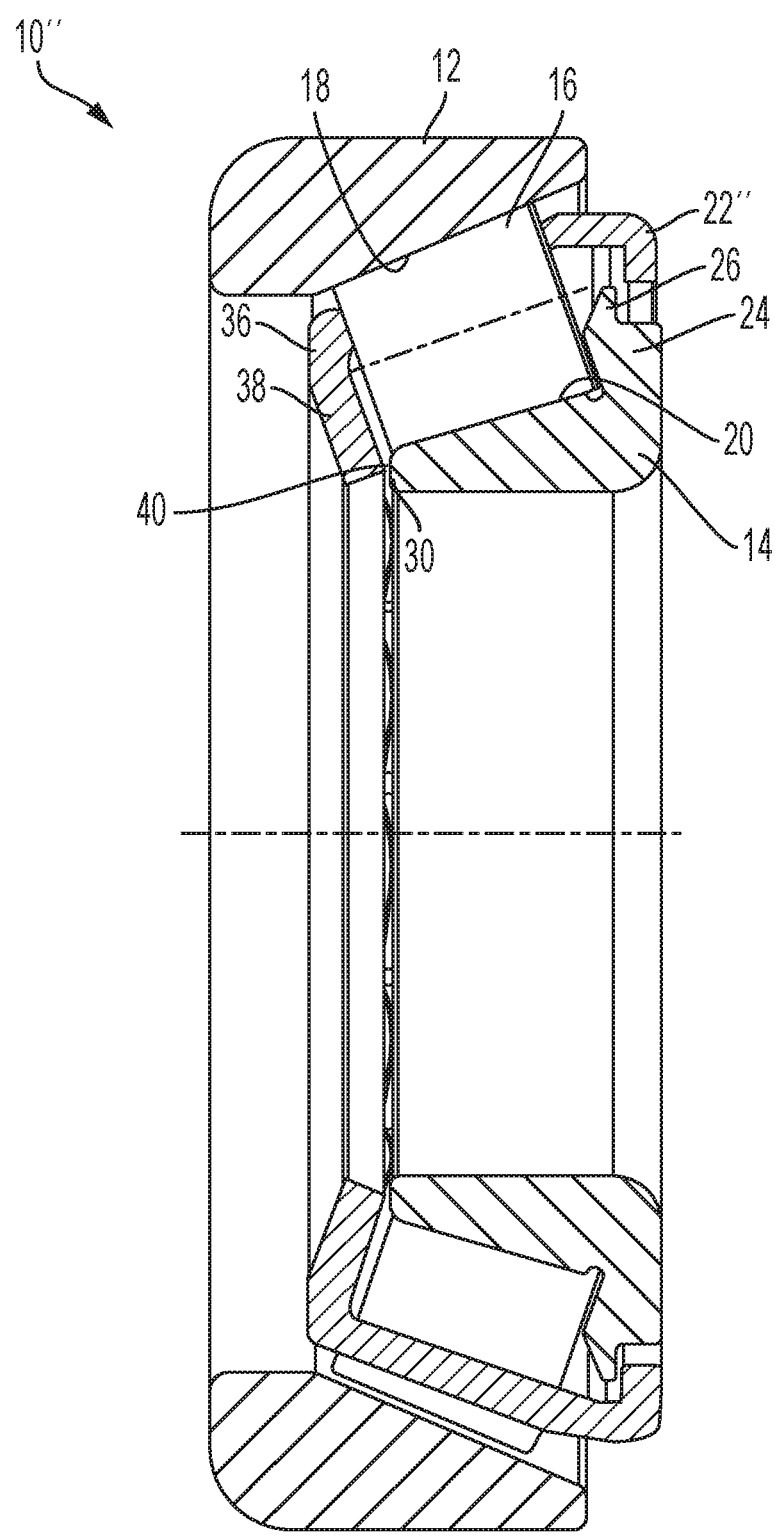
FIG. 3 is a cross-section of a tapered roller bearing, according to another embodiment.
Figure 4:
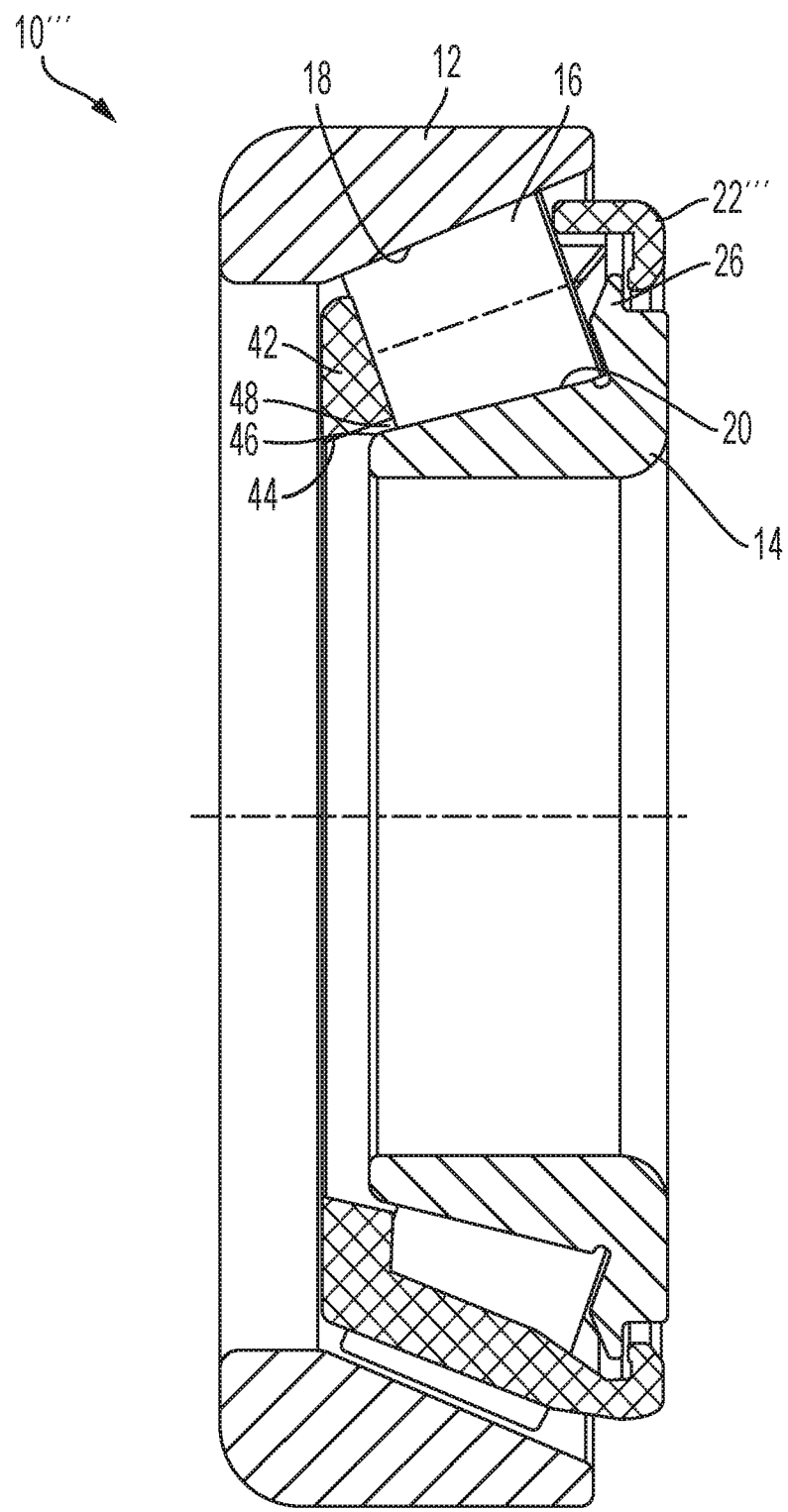
FIG. 4 is a cross-section of a tapered roller bearing, according to another embodiment.
Figure 5:
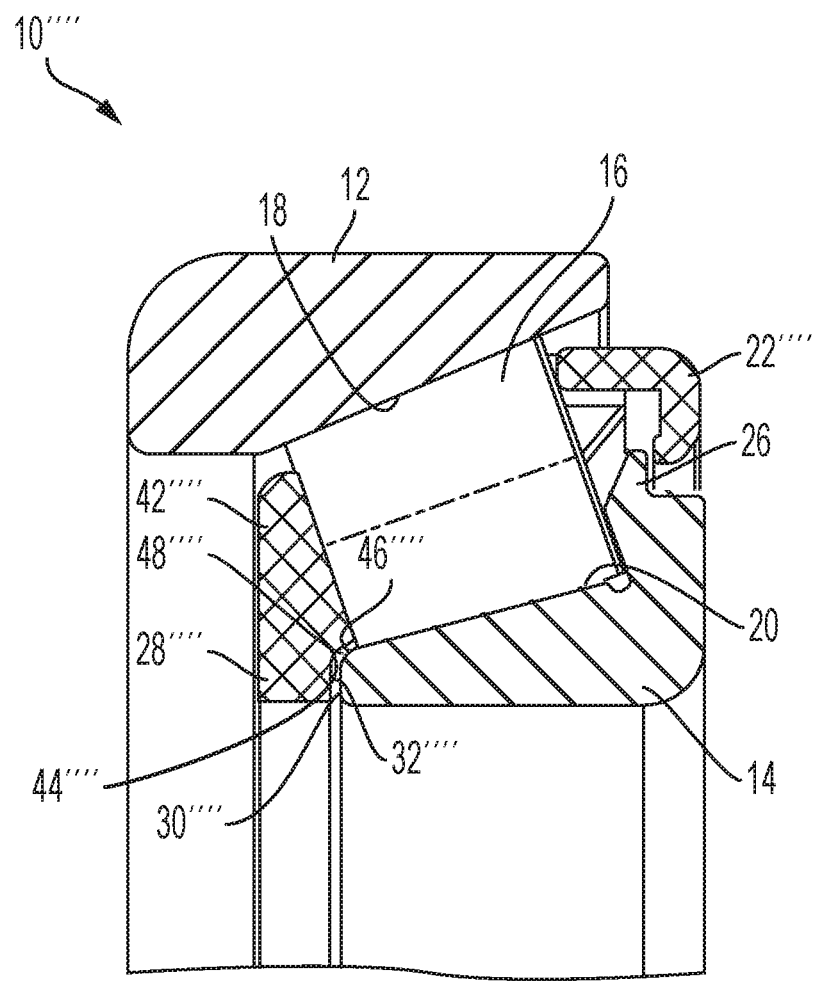
FIG. 5 is a cross-section of a tapered roller bearing, according to another embodiment.

In at least one embodiment, the inner ring 14 may not include a rib on the other (second) axial end proximate or near the smaller diameter end of the rollers 16. Stated another way, the inner ring 14 may not extend over the end face of the rollers on the smaller diameter end. In one embodiment, the inner ring 14 may terminate substantially at the same axial location as the rollers (e.g., as shown in FIGS. 1-3). In another embodiment, the raceway 20 may extend beyond the rollers 16, but does not turn radially outward. For example, the raceway 20 may extend beyond the rollers 16, but may remain parallel to the radially inner edge of the rollers (e.g., as shown in FIGS. 4-5, with the diameter of the raceway reducing at a constant rate).

Bearing lubrication can be a balance between having too much or too little lubricant. For purposes of discussion, oil will be used herein to describe lubricant, however, it is to be understood that non-oil lubricants are also contemplated for use with the disclosed bearings. If there is not enough oil in the bearing, there may be insufficient lubrication and damage to the bearing components may occur. If there is too much oil in the bearing, however, there may be an increase in friction due to churning of the oil. Accordingly, in at least one embodiment, the disclosed bearings are configured to control the oil flow in the bearing to maintain a good balance of oil quantity. The oil flow may be controlled by the physical structure of the bearings, such as by the shape or design of the bearings rings and the cage.

With reference to FIG. 1, a tapered roller bearing 10 is shown having components described above. In this embodiment, the cage 22 (which may be plastic) includes a radially extending portion 28 located axially on the smaller diameter end of the roller elements 16. The radially extending portion 28 may extend radially inward such that it overlaps with an axial end face 30 of the inner ring 14 on the smaller diameter end. The overlap of the radially extending portion 28 with the axial end face 30 may create a gap 32 between the cage 22 and the end face 30 of the inner ring 14. The gap 32 may have a substantially constant axial width between the portion 28 and the end face 30. In one example, the gap 32 may have a width of 0.1 to 1.5 mm, or any sub-range therein, such as 0.2 to 1.0 mm, 0.25 to 0.75 mm, or about 0.5 mm (e.g., +0.1 mm). Accordingly, the gap 32 may be considered a narrow gap having a radial length that is greater than its axial width. The narrow gap may control oil flow by limiting the amount of oil that can access the rollers 16, particularly from the radially inner direction (e.g., between the cage 22 and the inner ring 14).

With reference to FIG. 2, a tapered roller bearing 10' is shown. The bearing 10' includes components similar to bearing 10, and components having the same or substantially the same description are indicated with the same element number. Elements that are similar but include differences from bearing 10 are indicated with a tick mark ("'"). The primary difference in bearing 10' is the cage 22', particularly the radially extending portion 28'. In this embodiment, the radially extending portion 28' includes a curved axial end face 34. In one example, the curved axial end face 34 may be concave in the axial direction, as shown. This shape may cause the cage 22' to fling excess oil away from the rollers 16, thereby further controlling the amount of oil and reducing oil churning friction.

With reference to FIG. 3, a tapered roller bearing 10" is shown. Similar to above, components having the same or substantially the same description are indicated with the same element number and elements that are similar but include differences from bearing 10 are indicated with a double tick mark ("''"). In this embodiment, the cage 22" may be plastic, or it may be formed of metal. If metal, the cage 22" may be formed by a stamping process, although other manufacturing processes may also be used. The cage 22" may include a radially extending portion 36 and an angled portion 38. The angled portion 38 may extend radially inward and axially inward from the radially extending portion 36. The angled portion 38 may extend radially past the raceway 20 (e.g., more radially inward). A gap 40 may be formed between the angled portion 38 and the end face 30 of the inner ring. The gap 40 may be relatively short in the axial direction, and therefore may be referred to as a restriction, an aperture, or a port. The gap 40 may restrict oil flow to the rollers 16, particularly from the radially inner direction (e.g., between the cage 22" and the inner ring 14). The gap 40 may have similar dimensions (e.g., axial width) as the gap 32.

With reference to FIG. 4, a tapered roller bearing 10''' is shown. Similar to above, components having the same or substantially the same description are indicated with the same element number and elements that are similar but include differences from bearing 10 are indicated with a triple tick mark ("'''"). In this embodiment, the cage 22''' includes a portion 42 on the smaller diameter end of the rollers 16. Unlike portion 28 in bearing 10, the portion 42 does not extend radially inward past the raceway 20. Instead, a radially inner surface 44 of the portion 42 may extend substantially parallel to the raceway 20. In the example shown, the surface 44 may extend axially past the axial end face of the inner ring 14. However, in other embodiments, the surface 44 may be axially within the inner ring 14. The radially inner surface 44 may overlap with a portion 46 of the raceway 20 that extends beyond a contact region with the rollers. Accordingly, a gap 48 may be created between the surface 44 and the portion 46 of the raceway 20. The gap 48 may have a substantially constant width, which may be defined as the distance between the surface 44 and the portion 46. In one example, the gap width may be the same or similar to gap 32. Similar to the other bearing embodiments, the gap 48 may control the oil flow to the rollers 16 and may prevent excess oil from building up and causing churning friction.

With reference to FIG. 5, a tapered roller bearing 10'''' is shown. FIG. 5 is zoomed in relative to FIGS. 1-4 for detailed viewing. Similar to above, components having the same or substantially the same description are indicated with the same element number and elements that are similar but include differences from bearing 10 and bearing 10''' are indicated with a quadruple tick mark ("''''"). Bearing 10'''' includes a combination of elements from bearing 10 and from bearing 10'''. Similar to bearing 10, the cage 22'''' includes a radially extending portion 28'''' located axially on the smaller diameter end of the roller elements 16. The radially extending portion 28'''' may extend radially inward such that it overlaps with an axial end face 30'''' of the inner ring 14 on the smaller diameter end. The overlap of the radially extending portion 28'''' with the axial end face 30'''' may create a gap 32'''' between the cage 22'''' and the end face 30'''' of the inner ring 14. The gap 32'''' may have a substantially constant axial width between the portion 28'''' and the end face 30''''. In one example, the gap 32'''' may have a width of 0.1 to 1.5 mm, or any sub-range therein, such as 0.2 to 1.0 mm, 0.25 to 0.75 mm, or about 0.5 mm (e.g., +0.1 mm). Accordingly, the gap 32'''' may be considered a narrow gap having a radial length that is greater than its axial width. The narrow gap may control oil flow by limiting the amount of oil that can access the rollers 16, particularly from the radially inner direction (e.g., between the cage 22'''' and the inner ring 14).

In addition, similar to bearing 10''', the cage 22'''' includes a portion 42'''' on the smaller diameter end of the rollers 16. The portion 42'''' does not extend radially inward past the raceway 20. Instead, a radially inner surface 44'''' of the portion 42'''' may extend substantially parallel to the raceway 20. In the example shown, the surface 44'''' may extend axially past the axial end face of the inner ring 14. The radially inner surface 44'''' may overlap with a portion 46'''' of the raceway 20 that extends beyond a contact region with the rollers. Accordingly, a gap 48'''' may be created between the surface 44'''' and the portion 46'''' of the raceway 20. The gap 48'''' may have a substantially constant width, which may be defined as the distance between the surface 44'''' and the portion 46''''. In one example, the gap width may be the same or similar to gap 32. In another example, the gap width may be the same or similar to gap 32'''' (e.g., both gaps in bearing 10'''' may be the same). Similar to the other bearing embodiments, the gaps 32'''' and 48'''' may control the oil flow to the rollers 16 and may prevent excess oil from building up and causing churning friction.

Accordingly, multiple tapered roller bearings are disclosed that control and/or limit the amount of oil that is introduced to the rollers, thereby reducing churning friction in the bearings. The bearings have a rib on the larger diameter side of the rollers but, at least in some embodiments, do not have a rib on the smaller diameter side. The cages of the bearings may be supported or secured on the larger diameter side, for example, on a projection of the rib. On the smaller end, the cages may define a gap between a portion thereof and the inner ring. The gap may be a radial (e.g., vertical, as shown) channel or it may extend in a direction parallel to the raceway of the inner ring, or there may be channels extending in both directions. The gaps or channels may be referred to as a labyrinth, particularly those that have a relatively large aspect ratio (e.g., length to width), since they provide a tortuous path for the oil to flow through before reaching the rollers.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

What is claimed is:

1. A tapered roller bearing, comprising:
   an inner ring defining an inner raceway and an outer ring defining an outer raceway;
   a plurality of tapered rollers disposed between the inner and outer rings;
   a cage configured to retain the plurality of tapered rollers;
   the inner ring including a rib at a first axial end configured to retain a larger diameter end of the tapered rollers but not having a rib that is proximate a smaller diameter end of the tapered rollers; and
   a gap defined between the cage and the inner ring at the second axial end, the gap configured to control a lubricant flow to the plurality of tapered rollers.

2. The tapered roller bearing of claim 1, wherein the cage includes a radially extending portion that radially overlaps with an end face of the second axial end of the inner ring to form the gap.

3. The tapered roller bearing of claim 2, wherein the gap has a constant width defined between the cage and the end face.

4. The tapered roller bearing of claim 2, wherein the gap has a width of 0.1 to 1.5 mm.

5. The tapered roller bearing of claim 2, wherein an axially outer end face of the cage adjacent to the second axial end of the inner ring has a concave shape and is configured to fling away lubricant.

6. The tapered roller bearing of claim 1, wherein the cage includes a portion that extends radially and axially inward such that the portion radially overlaps with an end face of the second axial end of the inner ring to form the gap.

7. The tapered roller bearing of claim 6, wherein the cage is a stamped metal piece.

8. The tapered roller bearing of claim 1, wherein the cage includes a portion that extends parallel to the inner raceway and axially outward past an end face of the second axial end of the inner ring, the gap being formed between the portion and the inner raceway.

9. The tapered roller bearing of claim 8, wherein the gap has a constant width defined between the portion and the inner raceway.

10. The tapered roller bearing of claim 8, wherein the gap has a width of 0.1 to 1.5 mm.

11. The tapered roller bearing of claim 1, wherein the cage includes a first radially extending portion that radially overlaps with an end face of the second axial end of the inner ring to form a first section of the gap; and
    the cage includes a second portion that extends parallel to the inner raceway and axially outward past the end face of the second axial end of the inner ring, a second section of the gap being formed between the second portion and the inner raceway.

12. The tapered roller bearing of claim 11, wherein the first and second sections of the gap are contiguous.

13. The tapered roller bearing of claim 11, wherein the first and second sections of the gap have a same width.

14. The tapered roller bearing of claim 1, wherein the cage is retained on the rib at the first axial end of the inner ring.

15. The tapered roller bearing of claim 14, wherein the rib includes a projection and the cage is retained on the projection.

16. A tapered roller bearing, comprising:

an inner ring defining an inner raceway and an outer ring defining an outer raceway;

a plurality of tapered rollers disposed between the inner and outer rings;

a cage configured to retain the plurality of tapered rollers;

the inner ring including a rib at a first axial end configured to retain a larger diameter end of the tapered rollers and remaining radially inward of the tapered rollers at a second axial end that is adjacent to a smaller diameter end of the tapered rollers; and a gap defined between the cage and the inner ring at the second axial end, the gap having a width of 0.1 to 1.5 mm.

17. The tapered roller bearing of claim 16, wherein the cage includes a radially extending portion that radially overlaps with an end face of the second axial end of the inner ring to form the gap.

18. The tapered roller bearing of claim 16, wherein the cage includes a portion that extends radially and axially inward such that the portion radially overlaps with an end face of the second axial end of the inner ring to form the gap.

19. The tapered roller bearing of claim 16, wherein the cage includes a portion that extends parallel to the inner raceway and axially outward past an end face of the second axial end of the inner ring, the gap being formed between the portion and the inner raceway.

20. The tapered roller bearing of claim 16, wherein the cage is retained on the rib at the first axial end of the inner ring.

* * * * *